United States Patent [19]

Leonard, Jr.

[11] 4,109,827
[45] Aug. 29, 1978

[54] METHOD OF DISCHARGING PARTICULATE MATERIAL FROM A HOPPER

[75] Inventor: James H. Leonard, Jr., Houston, Tex.

[73] Assignee: Allied Industries Inc., Houston, Tex.

[21] Appl. No.: 795,122

[22] Filed: May 9, 1977

[51] Int. Cl.² .................... B65G 3/12; B65G 65/70
[52] U.S. Cl. .................................... 222/1; 222/478; 222/464
[58] Field of Search .................... 222/478, 464, 1

[56] References Cited

U.S. PATENT DOCUMENTS

| | | | |
|---|---|---|---|
| 3,029,986 | 4/1962 | Horn et al. | 222/478 |
| 3,076,582 | 2/1963 | Arcement | 222/464 |
| 3,094,243 | 6/1963 | Haugen | 222/478 X |
| 3,225,944 | 12/1965 | Reimbert | 222/478 X |

Primary Examiner—Allen N. Knowles
Assistant Examiner—David A. Scherbel
Attorney, Agent, or Firm—Kenway & Jenney

[57] ABSTRACT

A method of discharging particulate material from a hopper which minimizes vibration and impact loading is disclosed. The method provides a centrally located discharge column having a series of discharge openings extending vertically of an annular mass of particulate material in the hopper. The particulate material is discharged from a generally conically shaped, downwardly and inwardly directed, top portion of said mass of particulate material, progressively downwardly, through a choked flow discharge path provided by the interior of the discharge column.

2 Claims, 5 Drawing Figures

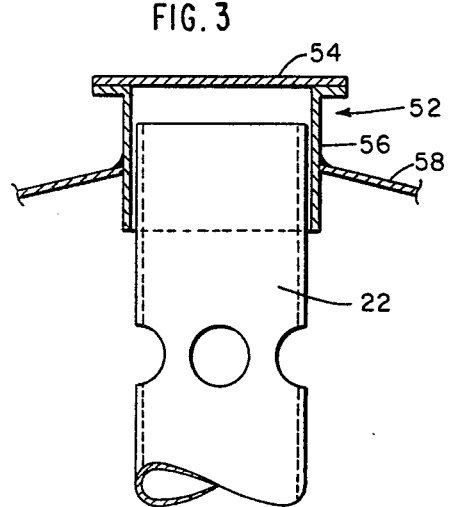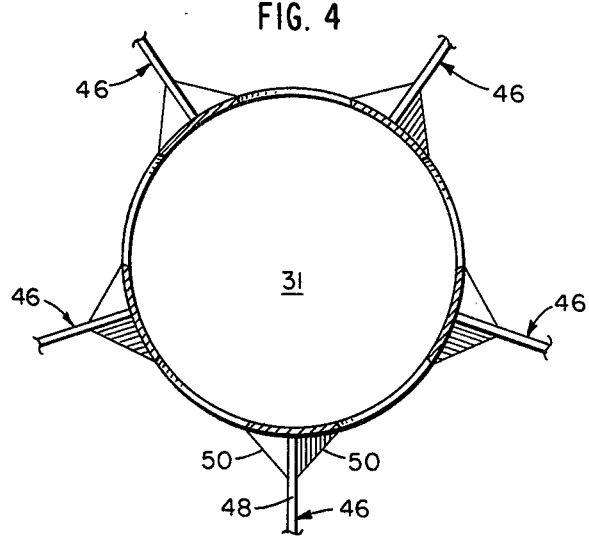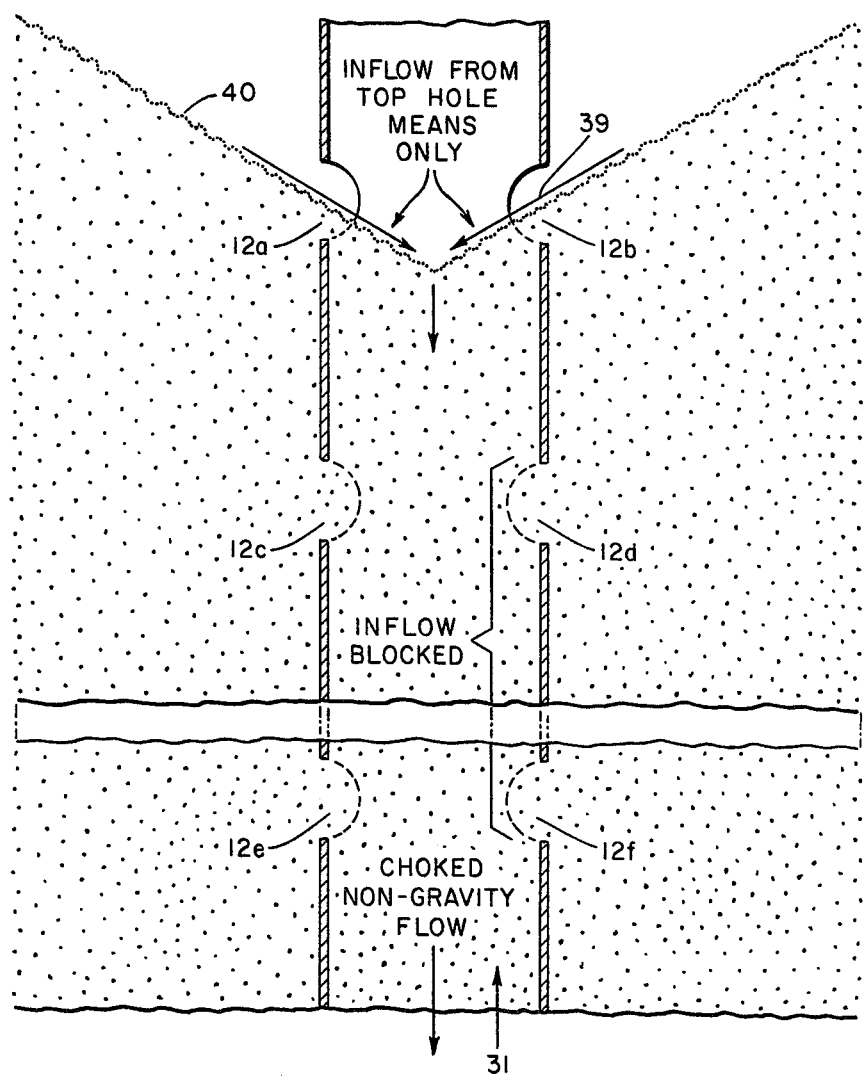

METHOD OF DISCHARGING PARTICULATE MATERIAL FROM A HOPPER

This invention relates to a method of discharging particulate material from a hopper, and in particular, to a method for discharging particulate material from the central portion of a hopper to minimize vibration and impact loading of a hopper.

BACKGROUND OF THE INVENTION

During the normal discharge of particulate material from a bottom discharge chute or nozzle of a hopper, there frequently results severe vibration and large impact loading at random times during the discharge cycle. The impact loading and vibration result from cavitation, followed by the abrupt filling of voids or holes in the particulate mass in the hopper. Cavitation is caused primarily from the non-homogeneous readjustment of the particulate mass in the hopper, during, for example, discharge through the bottom discharge nozzle. Thus, even though particulate material is removed from the bottom or other interior location of the particulate mass, the remainder of the mass does not immediately fill the voids that are thereby created in the interior portion. Then later, sudden filling of the thus created interior voids results in vibration and impact loading. Vibration and impact loading can generate substantial forces and may, in some instances, damage the hopper and associated equipment.

It is therefore a principle object of this invention to provide a method of discharging particulate material from a hopper which significantly reduces or eliminates the frequent high impact loading and vibration normally associated with the discharge of particulate material from a hopper. Other objects of the invention include providing a method which can be adapted to either new or existing hoppers of substantially any size or configuration. A further object of the invention is to provide a method which is simple to implement, which is reliable, which does not require expensive equipment or redesign, and which requires little or no maintenance.

SUMMARY OF THE INVENTION

The invention features a method of discharging particulate material from a hopper while minimizing impact loading on the hopper imparted to it by the particulate material. The method also minimizes the vibration of the hopper as a result of particulate discharge. The method features the steps of positioning a generally annular mass of particulate material within the hopper and surrounding a generally centrally located discharge column. A series of vertically spaced discharge openings are then provided in the discharge column, the series extending generally vertically and centrally of the annular mass of particulate material. The particulate material is then discharged from the generally annular mass through the openings of the discharge column and into a central interior portion of the column. The particulate material is discharged downwardly through the central discharge column to a material outlet.

The flow of particulate material is restricted to an extent sufficient to prevent a gravity induced rate of flow of particulate material outwardly from the material outlet, but to permit a choked flow of particulate material. The method further features maintaining a single downwardly and centrally converging generally conical portion at the top of the generally annular mass of particulate material within the hopper, the portion extending between the central discharge column and the hopper.

The method substantially prevents a discharge of particulate material from the annular mass into openings of the central discharge column below a level generally contiguous with an intersection of the generally conical portion and the central discharge column; prevents a reduction in density of the annular mass below the generally conical portion and within the annular mass; and prevents vibration of the hopper and impact loading of the annular mass on the hopper during discharging by substantially preventing concurrent discharging into the interior portion of the central discharge column of particulate material from materially different levels of the annular mass and from the interior thereof. The hopper is substantially continuously emptied according to the invention from its top, progressively downwardly, while substantially continuously blocking the discharge of particulate material from hopper portions below the generally conical portion. The method substantially continuously prevents the formation of cavities internally of the annular mass and prevents a discharge of particulate material from the annular mass at locations radially outwardly of the central column.

In preferred embodiments of the invention, the method features the steps of supporting the central column within the hopper with its lower end resting directly on a downwardly converging, generally conical hopper base and with its upper end telescopingly received by an upper hopper portion. The lower end of the central discharge column further cooperates with the base to provide a generally scalloped opening pattern whereby a discharge path for residual particulate material passing downwardly around the lower end of the central discharge column is provided. The method also features, in a preferred embodiment, providing a series of particulate material flow deflectors incorporated in a circumferentially spaced pattern extending about the lower end of the discharge column and operable to deflect particulate material into spaced openings of the scalloped opening pattern.

DESCRIPTION OF THE DRAWINGS

Other features, objects and advantages of the invention will appear from the following description of a preferred embodiment taken together with the drawings in which:

FIG. 3 is an elevation view of the top portion of the hopper showing the telescoping arrangement of the central discharge column and the hopper;

FIG. 4 is a cross-section view along 4—4 of FIG. 1; and

FIG. 5 is a schematic diagram of the discharge of particulate material according to the method of the invention.

DESCRIPTION OF A PREFERRED EMBODIMENT

Figure 1:
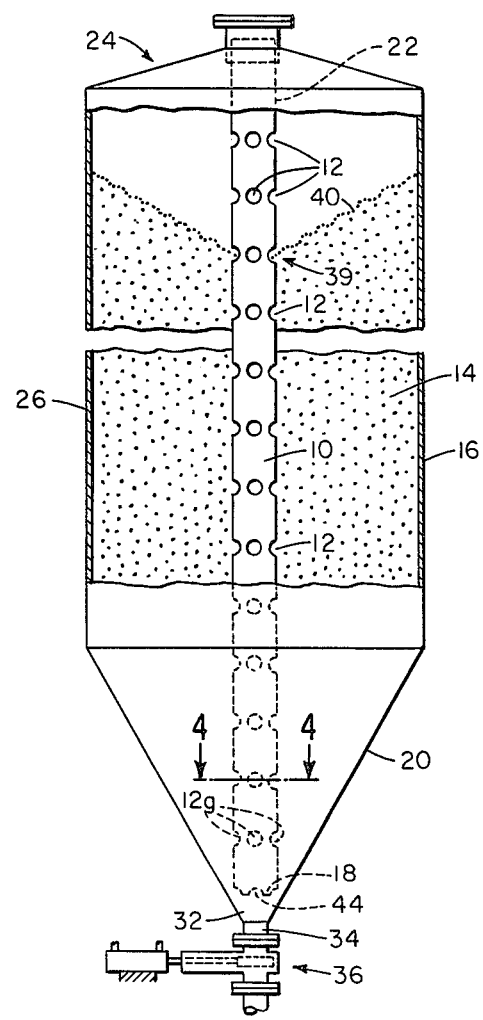
FIG. 1 is an elevation view of a preferred embodiment of the invention showing a central discharge column positioned within the hopper.

Referring to FIG. 1, according to the method of the invention, a centrally located discharge column 10 having a series of vertically spaced discharge openings 12 is provided extending generally vertically and centrally of an annular mass 14 of particulate material contained within a hopper or other vessel 16. The central discharge column 10 extends substantially the entire vertical distance of the hopper 16 and preferably, is supported therein with its lower end 18 resting directly on a downwardly converging generally conically shaped hopper base 20. The upper end 22 of discharge column 10 is telescopingly received by an upper hopper portion 24. The main portion 26 of the hopper is a substantially vertical, circular cylinder section.

Particulate material is discharged through openings 12 into an interior portion 31 of the central discharge column and then downwardly through the column to bottom 32 of hopper base 20. The particulate material leaves the hopper through a material outlet 34 to a flow restricting device 36. Flow restricting device 36 may be, for example, a manually controllable valve designed to restrict the rate of flow of particulate material passing therethrough, thereby restricting the rate of flow of particulate material through the material outlet 34. Other representative flow restricting devices are described in Burton U.S. Pat. No. 3,268,215, issued Aug. 23, 1966, and Seifarth U.S. Pat. No. 3,158,362, issued Nov. 24, 1964, both of which disclosures are incorporated herein by reference.

The flow of particulate material through material opening 34 is sufficiently restricted to prevent a gravity induced rate of flow of particulate material downwardly through the central discharge column but does permit a choked or restricted flow of particulate material through the central discharge column as in Seifarth noted above and incorporated herein by reference. With respect to the central discharge column, and referring to FIG. 5, this results in an inflow of particulate material substantially only at those openings in the column substantially contiguous with the intersection 39 of a top surface portion 40 of said annular mass 14 and the column as generally described in Burton, noted above and incorporated herein by reference. Thus, the inflow of particulate material is blocked at those openings 12 below a level generally contiguous with the intersection 39 of the top surface 40 of the generally annular shaped particulate mass and the central discharge column. Referring to FIG. 5, inflow occurs only at the uppermost level of holes 12a and 12b whereas the other discharge openings 12c, 12d, 12e, and 12f are blocked due to the choked, non-gravity, flow. There results, at the top of the particulate mass, a generally single, downwardly and centrally converging, conically shaped portion which extends between the central discharge column and the hopper. Thus, particulate flow through the material outlet of the hopper, in this particularly preferred embodiment, results essentially entirely from the uppermost level of the mass of particulate material. As a result, the method of the invention prevents the creation of cavities in the interior portions of the annular mass of particulate material and thereby minimizes vibration of the hopper and impact loading imparted thereto. This construction also substantially continuously prevents the discharge of particulate material from the annular mass 14 at locations radially outward of the central column and prevents a reduction in density of the annular mass of particulate material below the generally conical portion and within the annular mass. Problems such as excessive vibration, impact loading and reduction of density noted above would be expected to occur in free fall central column devices such as those described in Horn U.S. Pat. No. 3,029,986, issued Apr. 17, 1962, and Ledgett U.S. Pat. No. 3,490,655, issued Jan. 20, 1970.

The lower end of the central discharge column is provided with a scalloped edge 44 which, in cooperation with the lower base 20 of hopper 16 forms a generally scalloped opening pattern. The scalloped opening pattern provides a discharge path for residual particulate material passing downwardly around the lower end of the central discharge column. As long as there is a choked flow through the central discharge column from openings above the scalloped opening pattern, there will be substantially no flow through the scalloped openings for the same reason there is no flow through openings 12c, 12d, 12e, and 12f (FIG. 5). Nevertheless the scalloped opening pattern (or the equivalent), where provided, does result in a complete emptying of particulate material from the hopper because, when the level of the particulate mass is below the lowest of the series of discharge openings 12g, remaining particulate drains through the scalloped opening pattern.

Figure 2:
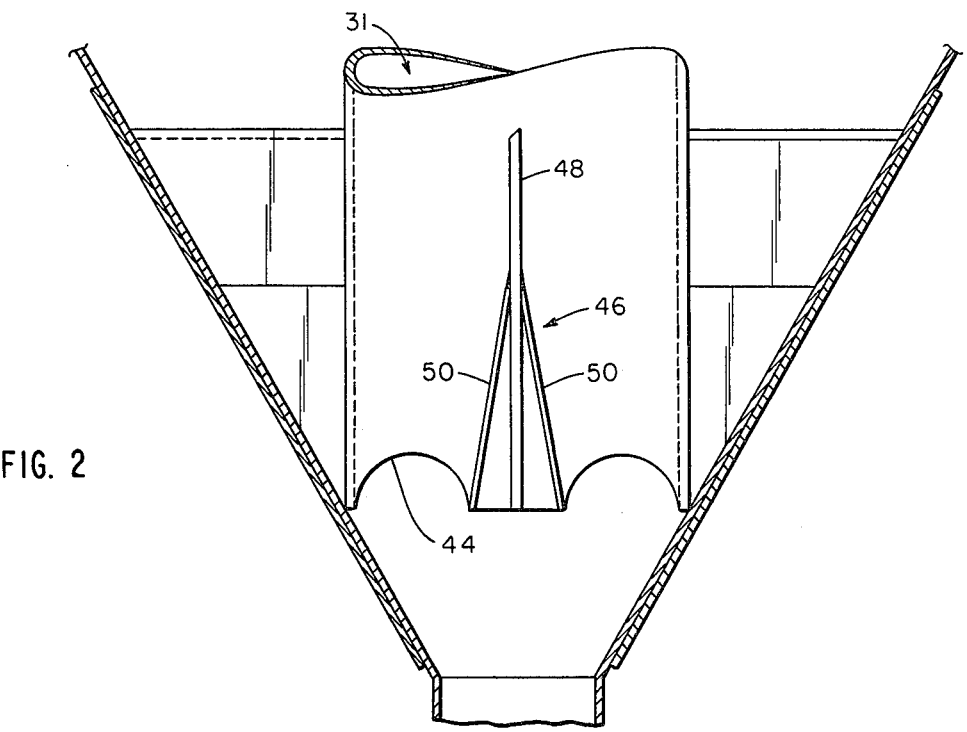
FIG. 2 is a partially broken elevation view of the bottom of the hopper showing a scalloped opening pattern and particle flow deflector.

Referring to FIGS. 2 and 4, the lower end 18 of central discharge column 10, at the scalloped portion, is advantageously provided with particulate material flow deflectors 46 which are preferably incorporated in a circumferentially spaced pattern around the central discharge column. The flow deflectors extend outwardly, substantially radially, and are operable to deflect particulate material into spaced openings of the scalloped opening pattern thereby preventing particulate material from being trapped in the bottom portion of the hopper. The flow deflectors generally include a radially extending, vertically oriented support member 48 secured, for example, by welding, to central discharge column 10 and to deflection members 50, one on either side of support member 48. Members 50 are secured, and preferably welded, to both the support member and the central discharge column 10.

In the preferred embodiment of the invention, as shown in FIG. 4, the discharge openings are equally spaced around a circumference of the central discharge column and are spaced at equal increments vertically along the discharge column (FIG. 1). In other embodiments, other patterns and shapes of discharge openings may be used, and the discharge column may also be of different cross-sectional shapes, for example, square, rectangular, etc.

Referring to FIG. 3, the upper end of the central discharge column 10 fits telescopingly in top portion 52 of the upper portion 24 of hopper 16. Top portion 52 which comprises top portion 54 and L-shaped side pieces 56 is preferably welded to top dome shaped portion 58 of hopper 16. The inside diameter of the top portion is slightly larger than the outside diameter of column 10 so that column 10 slidingly fits within the top portion 54. This construction allows for different coefficients of thermal expansion between the hopper and the discharge column which may be especially important in view of the height of a typical hopper, which may exceed 60 or 70 feet.

While a preferred method for supporting the central discharge column has been described, other methods may also be used; however, if residual particulate is not to be left in the hopper, it is important that discharge openings be provided between the lower end of the column and the hopper base portion.

UNOBVIOUSNESS, ADVANTAGES, AND SCOPE OF THE INVENTION

The method of discharging particulate material from a hopper or other vessel according to the invention advantageously minimizes vibration of the hopper and impact loading imparted to the hopper by the particulate material. The method also advantageously (A) prevents a reduction in density of the annular mass of particulate material below the generally conical upper surface of the annular mass and within the annular mass, (B) prevents the formation of cavities internally of the annular mass, (C) prevents a discharge of particulate material from the annular mass at locations radially outwardly of the central column, (D) prevents the vibration of the hopper and impact loading of the annular mass on the hopper during discharge by substantially preventing concurrent discharging, into the interior portion of the central discharge column, of particulate material from materially different levels of the annular mass and from the interior thereof, and (E) substantially continuously empties the hopper sequentially from the top thereof, progressively downwardly, while continuously blocking the discharge of particulate material from the hopper portions below the generally conical portion.

A further advantage of the method of the invention is the consequential reduction in wear of the hopper and the increased useful lifetime of the hopper.

While the structural components disclosed herein may be found in the art, the method as claimed hereinafter is new and unobvious. There is no teaching, suggestion, or disclosure in the prior art of a method to prevent cavitation in a hopper; and the consequential reduction in vibration and impact loading is similarly not disclosed or taught. While choked flow and top hole flow units have been previously known in connection with blenders (e.g., Seifarth and Burton noted above), they have not been used in central discharge systems where blending is not a factor. Indeed, the combination of choked flow and top hole flow is presented in the art solely as a blending technique with concurrent discharge from different levels of the particulate mass through the use of multiple tubes. In central discharge systems, which provide no blending function, perforate columns operate on a free flow theory, again to effect simultaneous discharge from different levels of the particulate mass. The present invention specifically prevents concurrent discharge at different levels and thus markedly departs from the teachings of the above noted prior art and thus achieves the advantages noted above and attributable to the invention as claimed. Thus, the seemingly incongruous adaption of choked flow and top hole flow principles to central column discharge — eliminating the prior art blending function — provides unobvious and singularly advantageous central column discharge, substantially free of prior art vibration, impact loading, etc.

Other embodiments of the invention will be obvious to those skilled in the art. Thus, change of shape, of either the hopper, the central discharge column, or the discharge openings are changes of form, not substance, and do not affect the discharge of particulate material according to the method of the invention. Such changes are within the scope of the claims which follow.

What is claimed is:

1. A method of discharging particulate material from a hopper while minimizing vibration of the hopper and impact loading imparted thereto by said particulate material, said method comprising the steps of:

positioning a generally annular mass of particulate material within the hopper, surrounding a generally centrally located discharge column;

providing a series of vertically spaced discharge openings in said discharge column, with said series extending generally vertically and centrally of said annular mass of particulate material;

discharging said particulate material from said generally annular mass through said openings of said discharge column into a central interior portion of said column and downwardly through said central discharge column to a material outlet;

supporting said central discharge column with said hopper, with its lower end resting directly on a downwardly converging, generally conical hopper base and with its upper end telescopingly received by an upper hopper portion;

providing said lower end of said central discharge column with a generally scalloped opening pattern in a cooperative relation to said base to provide a discharge path for residual particulate material passing downwardly around the lower end of said central discharge column;

restricting the flow of particulate material from said material outlet to an extent sufficient to prevent a gravity induced rate of flow of particulate material outwardly therefrom but to permit a choked flow of particulate material outwardly therefrom;

maintaining a single, downwardly and centrally converging, generally conical portion at the top of said generally annular mass of particulate material, extending between said central dischage column and said hopper;

substantially preventing a discharge of particulate material from said annular mass into openings of said central discharge column below a level generally contiguous with an intersection of said generally conical portion with said central discharge column;

substantially continuously preventing a reduction in density of said annular mass of particulate material below said generally conical portion and within said annular mass;

substantially continuously preventing vibration of said hopper and impact loading of said annular mass on said hopper during said discharging by substantially preventing concurrent discharging, into said interior portion of said central discharge column, of particulate material from materially different levels of said annular mass and from the interior thereof;

substantially continuously emptying said hopper sequentially from the top thereof, progressively downwardly, while substantially continuously blocking discharging of particulate material from hopper portions below said generally conical portion;

substantially continuously preventing the formation of cavities internally of said annular mass; and substantially continuously preventing a discharge of particulate material from said annular mass at locations radially outwardly of said central column.

2. A method as described in claim 1 including the step of providing a series of particulate material flow deflectors incorporated in a circumferentially spaced pattern, extending about said lower end of said central discharge column and operable to deflect particulate material into the spaced openings of said scalloped opening pattern.

* * * * *